United States Patent [19]

Manola

[11] Patent Number: 4,680,107
[45] Date of Patent: Jul. 14, 1987

[54] DEVICE FOR SEPARATION OF THE COMPONENTS OF EDIBLE MEALS

[75] Inventor: Umberto Manola, Brescia, Italy

[73] Assignee: The Protein's Technology S.p.A., Campobasso, Italy

[21] Appl. No.: 612,830

[22] Filed: May 22, 1984

[51] Int. Cl.⁴ .................... B07B 4/02; B07B 11/04
[52] U.S. Cl. .................... 209/139.2; 209/148; 209/150; 209/154
[58] Field of Search ............ 209/138, 139 A, 139 R, 209/148, 150, 154

[56] References Cited

U.S. PATENT DOCUMENTS

| | | | |
|---|---|---|---|
| 1,445,760 | 2/1923 | Drake | 209/150 |
| 1,569,468 | 1/1926 | Ely | 209/150 X |
| 2,739,708 | 3/1956 | Denovan | 209/138 |
| 3,986,949 | 9/1976 | Di Duca et al. | 209/137 X |
| 4,152,254 | 5/1979 | Steier et al. | 209/148 |
| 4,288,318 | 9/1981 | Eissmann | 209/150 X |
| 4,299,694 | 11/1981 | Goodell | 209/139.1 |
| 4,515,686 | 5/1985 | Janich | 209/139 A |

FOREIGN PATENT DOCUMENTS

| | | |
|---|---|---|
| 9221 | 3/1880 | Fed. Rep. of Germany . |
| 893905 | 7/1949 | Fed. Rep. of Germany . |
| 1261737 | 7/1965 | Fed. Rep. of Germany . |
| 560279 | 9/1957 | France . |
| 1403495 | 5/1965 | France . |
| 1520781 | 3/1968 | France . |
| 1161087 | 8/1969 | United Kingdom . |

Primary Examiner—Kenneth M. Schor
Assistant Examiner—Thomas M. Lithgow
Attorney, Agent, or Firm—Pollock, Vande Sande & Priddy

[57] ABSTRACT

The separator device comprises a vertical, cylindrical container (4), provided at the bottom with a rotary discharge valve (9) and provided with a duct (5) which opens into its top portion and is connected to the feeding source of the meal. This duct (5) discharges the meal onto the top of a conical downwardly diverging tray (1) arranged in the container (4), and arranged at a suitable distance below said tray (1) is another conical member (6) also diverging downwardly and provided with an upwardly directed peripheral edge (106) extending beyond the peripheral outline of the tray, and closely spaced from the side surface of the cylindrical container. At the top of the conical member (6) is an opening (10) which is connected to a conduit (11) extending through the wall of the container (4) and connected to a suction source. Inside the container (4) below the conical members (1, 6), there opens a conduit (15) communicating with the atmosphere.

3 Claims, 6 Drawing Figures

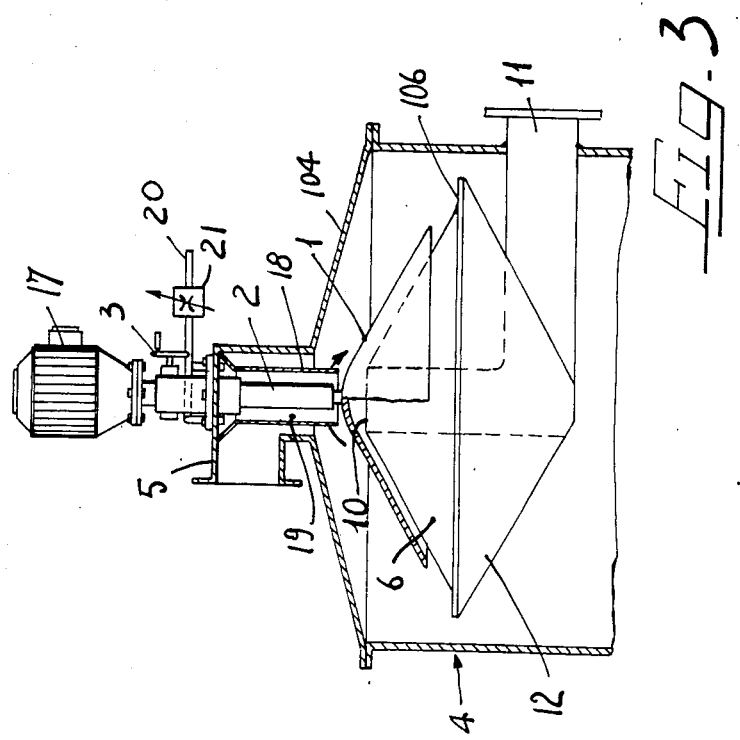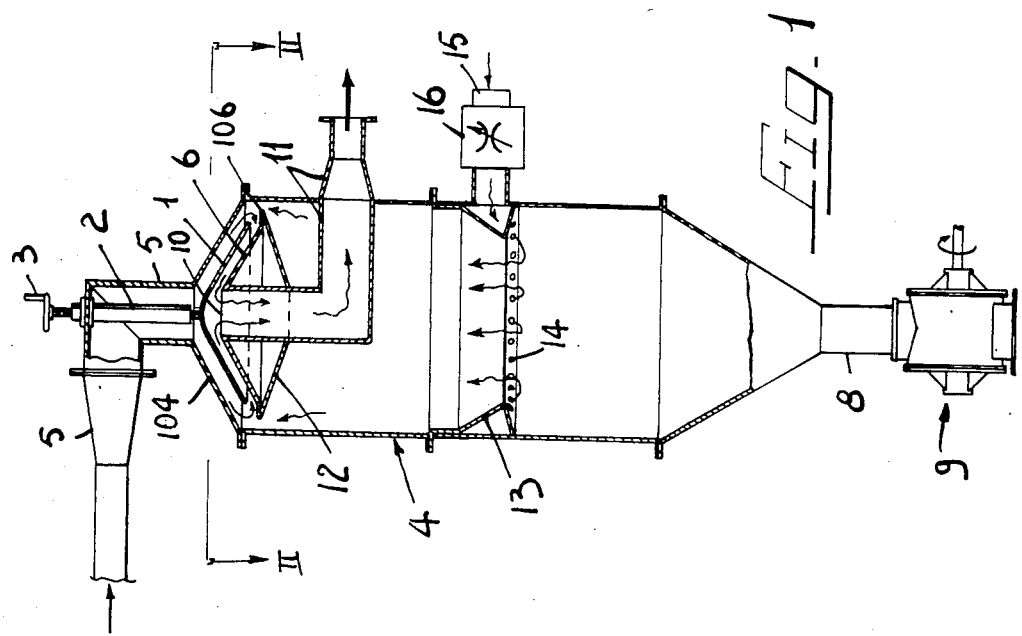

DEVICE FOR SEPARATION OF THE COMPONENTS OF EDIBLE MEALS

SUMMARY OF THE INVENTION

Methods are known of separating, into different amounts having different proteic content, meals to be used as edible or as chemical-pharmaceutical products, said methods being based on a ventilation sifting of the product, wherein the parts to be separated are placed in a series of cyclone separators which are serially traversed by the air entraining the product and are each provided, in the lower part thereof, with star-type rotary valves for continuous discharge of the amounts of precipitated product. The plants designed heretofore to carry this method into effect are of complicated construction, difficult to adjust and adapt, and they are subject to so many inconveniences and drawbacks in their operation as to be unqualified to be used on an industrial scale. In the known plants, the product is circulated through the various separators by a flow of pressurized air generated by an electric fan or similar device located upstream of the plant. These devices are, notoriously, sources of heat and, due to their location, they transfer said heat to the entire plant and, therefore, to the product so as to inevitably modify it in the nutritive capacity and/or other characteristics thereof. Meals discharged by the known plants, in fact, are characterized by a much darker shade than the meals originally fed to the plant.

OBJECT OF THE INVENTION

This invention proposes a plant for the pneumatic separation of meal components, adapted to operate with a reduced power input and to obviate all said drawbacks, thanks to the fact that:

it utilizes new separator devices provided with control means permitting an accurate adaptation to various requirements;

the circulation of the product through the various operative units of the plant is caused by the suction exerted by a compressor which is connected with its suction mouth to the last unit of the plant. The air circulating in the plant, therefore, is not a source of appreciable increase of temperature, because the heat produced by the compressor is downstream of the entire plant and may be easily dissipated by means of simple provisions;

the compressor is preferably of the volumetric type, thereby ensuring a repetitive and constant operation of the plant.

BRIEF DESCRIPTION OF THE DRAWINGS

The characteristic features of the device and plant according to the invention, and the advantages resulting therefrom, will be apparent from the following description of some preferred embodiments thereof, illustrated merely as non-limiting examples in the accompanying drawings, in which:

FIG. 1 is a longitudinal sectional view of a device according to the invention;

FIGS. 3 and 4 are sectional views of the top portion of the device in accordance with two possible modified embodiments;

DESCRIPTION OF THE PREFERRED EMBODIMENT

Figure 2:
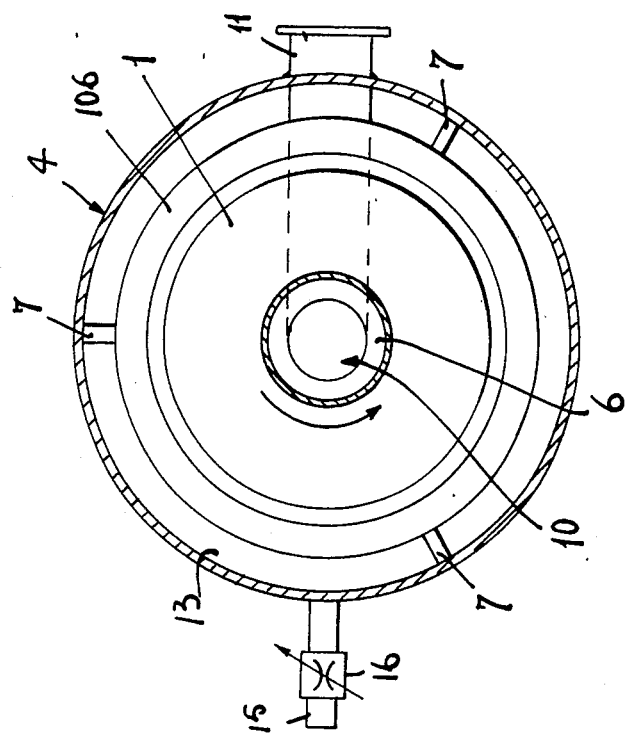
FIG. 2 is a cross-sectional view, on the line II—II, showing some constructional details of the device of FIG. 1.
Figure 6:
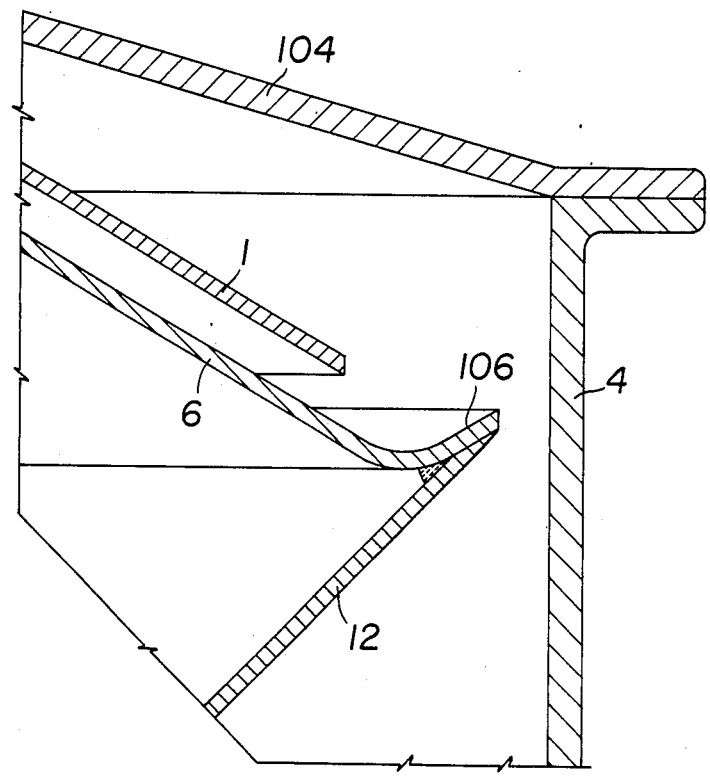
FIG. 6 is a detail section view showing the upwardly bent edge of the lower conical structure.

With reference first to FIGS. 1 and 2, it will be seen that the device according to the invention comprises a downwardly-diverging conical tray 1, having a vertical axis and supported in an axially movable manner by a screw-and-nut 2 with a control handwheel 3. The unit 2 is co-axially secured on the top of a container 4 which is preferably of cylindrical shape and round section, but which may also be of slightly conical shape. Fixed on the top of said container is at least one conduit 5 connected to the feeding source of the product to be treated, such that the product will be discharged on the rounded apex of the tray 1. Preferably, also the top portion 104 of the container 4 is conical and is located at a relatively short distance from tray 1, so that the product being fed through 5 is compelled to lap this conical portion to be distributed thereby over the entire round angle. Below the tray 1 and axially aligned therewith there is provided a conical structure 6, also diverging downwardly but of greater height than the aforesaid conical tray 1 so that its peripheral edge or collar 106 (shown in detail in FIG. 6) extends beyond the peripheral outline of the conical tray 1. The generatrices of the structures 1 and 6 are preferably parallel to each other, but it is to be understood that they may be of different inclination and either diverging or converging upwards.

The collar 106 is suitably bent upwards and is located at a relatively short distance from the inner side surface of the container 4, to which it may be secured by means of lugs 7 (FIG. 2) angularly spaced from one another and suitably streamlined so as to avoid excessive turbulence.

The container 4 has a tapering bottom and is provided with a discharge conduit 8 shut off by a rotary valve 9 of the so-called star type.

The apex of the conical structure 6 presents an opening 10 having a conduit 11 connected thereto and located under the structure 6. Said conduit 11 leads out from the container 4 in an airtight manner.

The conical structure 6 has a bottom formed by a conical upwardly-diverging counter-member 12, welded both to the conduit 11 and to the edge 106.

Secured co-axially below the assembly 1-6 and at a suitable distance therefrom within the container 4, there is provided an annular air inlet 13 having presenting one or more downwardly-directed openings 14 and connected to at least one conduit 15 opening to the atmosphere under the control of valve means 16, for example, formed by a suitable variable restrictor.

The described device is connected by the conduit 11 to a suction source (see below) of such a performance as to cause the suction of the product through the conduit 5. As stated above, the product being fed through the conduit 5 falls on the top of the tray 1, is distributed thereby over the round angle and evenly reaches the collar 106 and the annular space between said collar and the inner side surface of the container 4. Here the product meets an ascending flow of air sucked from outside through 13-14-15-16 and regulated by means of valve 16 to such an extent that the heavier particles of the product drop down to the bottom of the container 4, wherefrom they will be evacuated continuously through the valve 9, and that the lighter particles remain in suspension and follow the flow of air exiting from the device through the structures 1-6 and through the conduit 11.

By actuating the handwheel 3 and thus modifying the distance between the members 1 and 6, the action of the device can be modified, for example to compensate for some variables and to adapt the device for treatment of products of a different nature and/or fineness.

Figure 4:
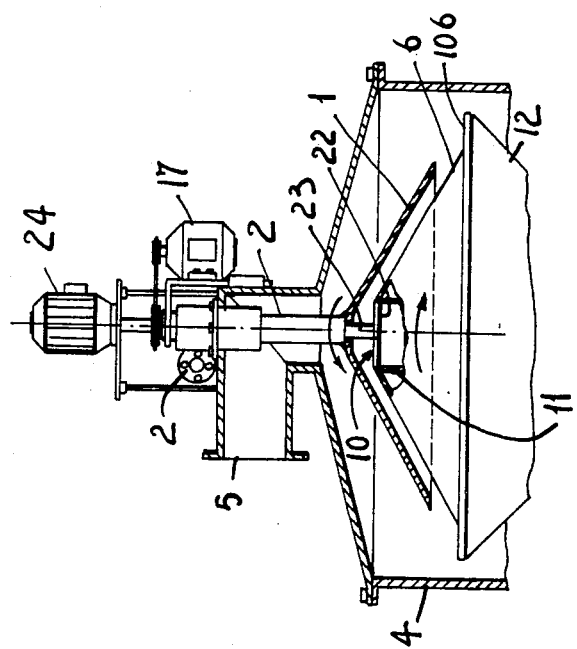

To improve the fluidity of the product at the inlet of the device, one or more modifications may be adopted. According to FIG. 3, for example, the conical tray 1 can be rotated about its axis, at low speed, by a driving unit 17. Still according to FIG. 3, co-axially with the means supporting the tray 1, there is provided a tube 18 which opens, at the lower end thereof, at a short distance from the top of the tray and which is fixed to the conduit 5 so as to form a chamber 19 which is open only at its lower end and which comunicates with the atmosphere through one or more conduits 20 that may be shut off by valve means 21 formed, for example, by a variable restrictor. Since the container 4 is subjected to suction through the conduit 11, air is drawn thereinto from the outside through 21-20-19-18 and is discharged onto the top of the tray 1 so as to fluidize the product at the inlet of the device. In the embodiment shown in FIG. 4, also the structure 6 can be slowly rotated about its axis, if structurally disconnected from the parts 7,12,11 and connected, through a spider 22 and a shaft 23, to driving means 24.

According to a further modified embodiment, not illustrated because it is apparent to those skilled in the art and could be easily constructed, the structure 6 and respective bottom 12 may be provided with holes and/or slots to fluidize the product in the path between the two conical members. Similar holes and/or slots may also be formed in the tray 1.

Figure 5:
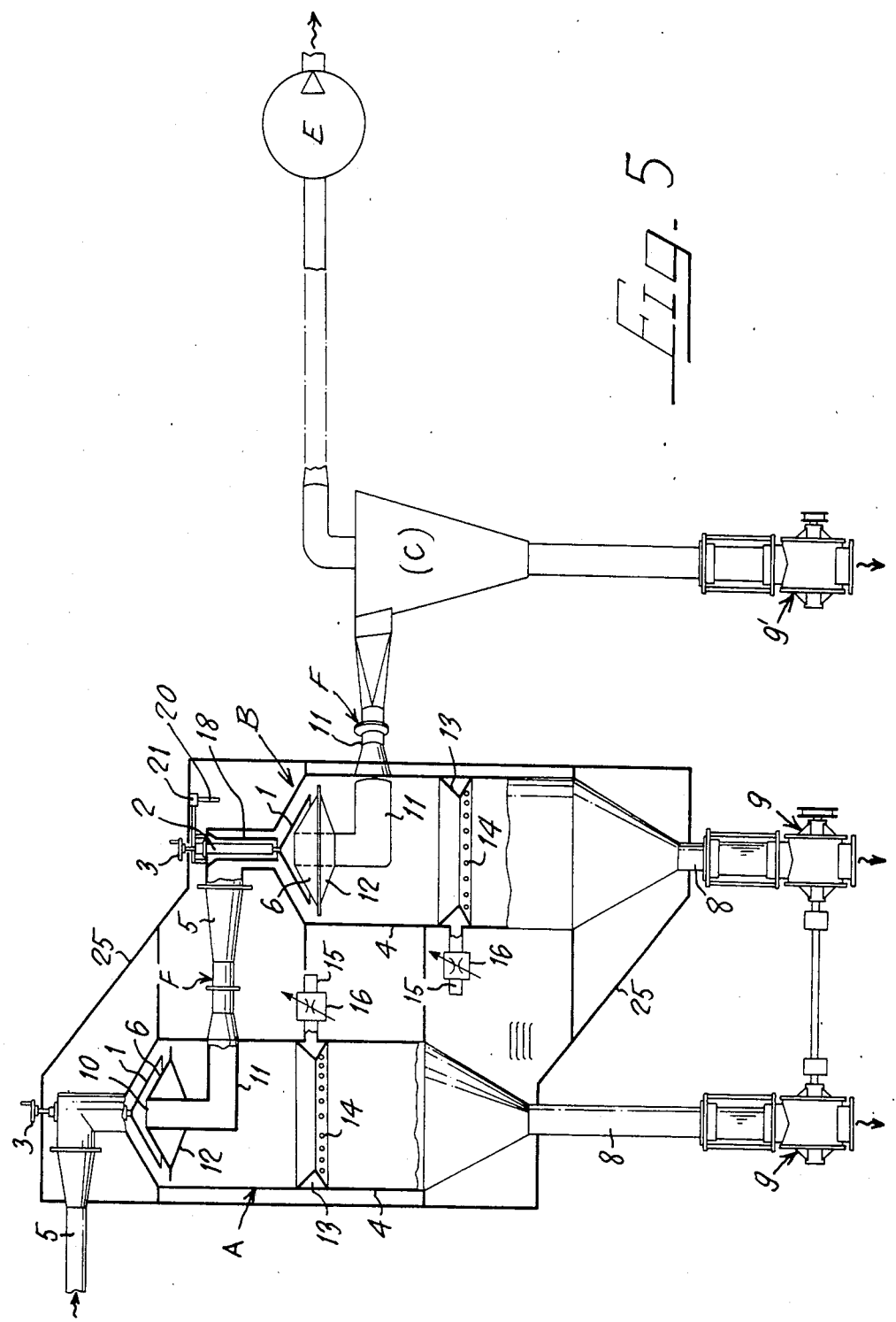
FIG. 5 is a side elevational view, with some portions in sectional view, of the essential components of a plant comprising devices of the type shown in the preceding figures.

With reference to FIG. 5, a plant utilizing devices of the type set forth above will be described. The installation comprises at least two serially connected devices of the just described type, of similar size, indicated by reference letters A and B, and comprises one or more cyclone separators C of the entirely conical type, provided at the bottom with respective rotary discharge valves 9'. The last cyclone is connected to the suction of a compressor E of suitable characteristics and preferably of volumetric type so as to ensure to the plant a constant operation. The conduits connecting the various units to one another are preferably so shaped as to comprise an intermediate restriction F having the function to axially canalize the product in these conduits. The product, sucked by the conduit 5 of the plant, traverses the various units A-B-C successively and accumulates therein in gradually increasing order of fineness, whereby the coarest particles will be discharged from the unit A and the finest particles will be discharged from the unit C.

The units A and B are enclosed by a partially-open structure 25, made of materials also having high capacity of heat and sound insulation. All the suction conduits of the units A and B open into the structure 25, while the means for regulating the valves arranged in these conduits are controlled from the outside. The structure 25 ensures an accurate operation of the installation, because the units A and B are not affected by any variations of the ambient temperature, and also ensures a noiseless operation of the installation. A controlled atmosphere may be created, if necessary, within the structure 25 to obtain an accurate or particular operation of the installation, and gaseous or powdered substances may be admitted thereinto to be sucked, if desired, into the units A and B.

I claim:

1. Apparatus for the physical separation of components of meal to be used as edible or as chemical-pharmaceutical products, comprising
    (a) a conical, downwardly diverging tray (1) arranged coaxially in the upper portion of a vertical, substantially cylindrical container (4) having at its bottom a discharge conduit (8) controlled by a valve (9);
    (b) means for feeding said meal to be treated above said conical tray (1) so that it will be evenly distributed over a round angle;
    (c) a further conical structure (6) also diverging downwardly, arranged at a short distance below said conical tray (1) and secured to said container (4), said conical structure (6) having an upwardly bent peripheral edge (106) extending beyond the periphery of said conical tray (1) and closely spaced from an inner side surface of said container (4);
    (d) means (2, 3) for adjusting the distance between said conical tray (1) and said conical structure (6) so as to adjust the rate of flow traversing them;
    (e) said conical structure (6) having a bottom (12) formed by a conical upwardly diverging countermember, so as to avoid turbulence which could affect operation of said apparatus;
    (f) at least one opening (10) in said conical structure (6) connected to a conduit (11) which passes in airtight manner out of said container (4) and is connected to a suction means;
    (g) an annular air inlet means (13) arranged below said conical structure (6) coaxially therewith and connected to at least one conduit (15) opening to the atmosphere under the control of valve means (16), whereby, due to suction exerted by said suction means, an ascending flow of air is formed that permits heavier particles of said meal to drop downwardly and retains lighter particles in suspension to follow an air stream flowing out of said apparatus, through said conical member (1, 6) and said conduit (11) connected to said at least one opening (10).

2. Apparatus according to claim 1, comprising means (17, 24) for rotating said conical tray (1) and said conical structure (6) so as to better fluidize said meal to be treated and/or distribute it over said round angle.

3. Apparatus according to claim 1, comprising a tubular member (18) having a lower end opening a short distance from the top of said conical tray (1), and communicating with the atmosphere through at least one conduit (20) controlled by valve means (21), whereby a flow of air having suitable pressure and flow rate characteristics is admitted thereinto and is conveyed against said conical tray (1).

* * * * *